US012436061B2

(12) United States Patent
Han et al.

(10) Patent No.: US 12,436,061 B2
(45) Date of Patent: Oct. 7, 2025

(54) INTEGRATED MULTIDIRECTIONAL LOADING MODEL TEST DEVICE FOR OFFSHORE WIND TURBINES

(71) Applicant: SHANDONG UNIVERSITY, Shandong (CN)

(72) Inventors: Bo Han, Jinan (CN); Bonan Zhang, Jinan (CN); Ben He, Jinan (CN); Song Dai, Jinan (CN); Wei Li, Jinan (CN); Na Lv, Jinan (CN); Jinyong Guo, Jinan (CN); Baogang Wang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 278 days.

(21) Appl. No.: 18/173,876

(22) Filed: Feb. 24, 2023

(65) Prior Publication Data
US 2023/0296082 A1 Sep. 21, 2023

(30) Foreign Application Priority Data

Mar. 21, 2022 (CN) .......................... 202210278649.4

(51) Int. Cl.
*G01M 10/00* (2006.01)
*G01M 5/00* (2006.01)
*G01M 99/00* (2011.01)

(52) U.S. Cl.
CPC .......... *G01M 10/00* (2013.01); *G01M 5/0025* (2013.01)

(58) Field of Classification Search
CPC .... G01M 10/00; G01M 5/0025; G01M 13/00; G01M 99/007; G01M 9/062; G06F 30/23;
(Continued)

(56) References Cited

U.S. PATENT DOCUMENTS

2012/0189390 A1\* 7/2012 Belinsky ................. F03D 13/10
405/209
2020/0173422 A1\* 6/2020 Casanovas Bermejo ....................
F03D 80/82

FOREIGN PATENT DOCUMENTS

CN  101357344 A  2/2009
CN  103398910 A  11/2013
(Continued)

OTHER PUBLICATIONS

Oct. 25, 2022 Office Action issued in Chinese Patent Application No. 202210278649.4.
(Continued)

*Primary Examiner* — Brandi N Hopkins
(74) *Attorney, Agent, or Firm* — Oliff PLC (57) ABSTRACT

An integrated multidirectional loading model test device for offshore wind turbines, including a water flume, a wave-making mechanism at first end of water flume, a top hood at top of water flume to form air duct, a first end of the top hood as air inlet end and a fan at second end of top hood, a seabed soil holding sink at a set position at bottom of water flume, a rotating disk at bottom of interior of seabed soil holding sink, a model barrel for placing seabed soil and the offshore wind turbine model is fixed on the rotating disk, and the rotating disk is connected to a driving mechanism to drive model barrel to rotate, so that a relative motion between the model barrel and the fixed water flume can be generated to achieve the wind and wave loads in different directions on the offshore wind turbine model.

8 Claims, 5 Drawing Sheets

(58) Field of Classification Search
CPC ...... G06F 30/28; G09B 23/188; G01H 13/00;
F03D 13/25; F03D 17/00; Y02B 10/30;
E02D 33/00; E02D 27/425; Y02E 10/72;
Y02E 10/30; Y02E 10/727; B63B 35/44;
B63B 21/50
USPC .......................................................... 73/148
See application file for complete search history.

(56) References Cited

FOREIGN PATENT DOCUMENTS

| | | | |
|---|---|---|---|
| CN | 104020007 | A | 9/2014 |
| CN | 105604106 | A | 5/2016 |
| CN | 108343096 | A | 7/2018 |
| CN | 110173008 | A | 8/2019 |
| CN | 110553939 | A | 12/2019 |
| CN | 111707443 | A | 9/2020 |
| CN | 111735608 | A | 10/2020 |
| CN | 113109013 | A | 7/2021 |

OTHER PUBLICATIONS

Li et al., "Model test design method of dynamic response for offshore wind turbines under the combined action of wind and wave", Laboratory Science, vol. 19, No. 6, Dec. 2016, pp. 1-7.

* cited by examiner

INTEGRATED MULTIDIRECTIONAL LOADING MODEL TEST DEVICE FOR OFFSHORE WIND TURBINES

CROSS-REFERENCES TO RELATED APPLICATIONS

The present invention claims priority benefits to Chinese Patent Application No. 202210278649.4, filed 21 Mar. 2022, the contents of which are incorporated herein by reference.

TECHNICAL FIELD

The present invention relates to the technical field of test equipment, and specifically to an integrated multidirectional loading model test device for offshore wind turbines.

BACKGROUND

The statements in the present section merely provide background technical information related to the present invention and do not necessarily constitute prior technology.

Vigorous development of new renewable energy sources is an important way to solve energy shortage and sustainable development of the environment. Offshore wind power is rich in resources, stable wind speed, land saving, small environmental noise constraints, and suitable for large-scale development, which is an important measure to adjust the power structure and reduce the dependence on fossil energy.

For large flexible wind turbine blades, they will produce vibration and deformation under the action of wind, wave and current. The upper load is transferred to seabed soils through the foundation, and an interaction between pile rock/soil causes the stiffness attenuation of seabed soils; the bearing capacity of rock and soil is weakened, meanwhile, it also reacts on the wind turbine structure. At the same time, under the aerodynamic performance of the blade structure, the fluid field will also be affected by the operating state of the wind turbines.

However, the inventors found that the existing methods for analyzing the safety of the offshore wind turbines are to test the upper wind turbine structure and the lower foundation independently, and simplify the loads of wind, wave and current as a horizontal force applied to the wind turbine structure, and could not consider the characteristics of fluid load changes in time and space, and the interaction and mutual feedback coupling mechanism between offshore wind turbines and complex external environment (wind, wave and seabed geology); in addition, when conducting the wind and wave-wind turbines multi-field coupling test, the directions of wind and wave cannot be changed, and only a single load working condition can be considered, which is quite different from the actual marine environment; for the deep-water pool type offshore wind turbine test, matrix fans are set around the pool to simulate the multi-directional wind load, but the cost is expensive, and the wind speed is difficult to stabilize.

SUMMARY

To overcome the shortcomings of the prior art, it is an objective of the present invention to provide an integrated multidirectional loading model test device for offshore wind turbines, which may consider a variety of testing working conditions and is more in line with the actual marine environment.

To achieve the above purpose, the present invention uses the following technical solutions.

It is an example of the present invention to provide an integrated multidirectional loading model test device for offshore wind turbines, comprising a water flume, a wave-making mechanism provided at a first end of the water flume, a top hood provided at a top of the water flume to form an air duct, a first end of the top hood as an air inlet end and a fan is provided at a second end of the top hood, a seabed soil holding sink provided at a set position at a bottom of the water flume, a rotating disk provided at a bottom of an interior of the seabed soil holding sink, a model barrel for placing seabed soils and an offshore wind turbine model is fixed on the rotating disk, and the rotating disk is connected to a driving mechanism to drive the model barrel to rotate, so that a relative motion between the model barrel and the fixed water flume can be generated to achieve the application of wind and wave loads in different directions to the offshore wind turbine model.

Optionally, both the seabed soil holding sink and the model barrel arc of cylindrical structure, and a gap between an outer side of the model barrel and an inner side of the seabed soil holding sink is less than a set value, or the outer side of the model barrel slides against the inner side of the seabed soil holding sink, or the outer side of the model barrel is provided with a sealing ring against the inner side of the seabed soil holding sink.

Optionally, the driving mechanism comprises a driving component, the driving component is connected to a connecting rod via a transmission mechanism, a first end of the connecting rod is fixedly connected to the rotating disk, and a second end of the connecting rod is rotatably connected to a tank wall of the bottom of the seabed soil holding sink.

Optionally, the transmission mechanism comprises a first gear fixed to the connecting rod, the first gear engages with a second gear, the second gear is connected to an output shaft of the driving component, a bottom end of the first gear is fixedly connected to a first end of a support rod, and a second end of the support rod is rotatably connected to a bottom support structure via a thrust bearing, the bottom support structure is used for fixing to a foundation;

Further, a rotation angle detection element is mounted on the first gear and/or the second gear.

Optionally, a wind speed detection element is provided in the air duct, and the wind speed detection element is mounted on a frame body placed inside the water flume.

Optionally, the top hood comprises a wind field section and a transition section, the wind field section being made up of a plurality of hoods spliced together, the transition section being of an involute structure with a smaller area end connected to the wind field section and a larger area end connected to the fan via a flexible tube.

Optionally, a flow stabilization grid and a damping grid are mounted inside the flexible tube.

Optionally, a width of the water flume is 1.5-1.7 m.

Optionally, a water outlet end of the water flume is connected to an inlet of an inverter pump through a pipeline, and an outlet of the inverter pump is connected to a water inlet end of the water flume through a pipeline.

Optionally, the first end of the water flume is provided with the wave-making mechanism and a second end thereof is provided with a wave-dissipating mechanism.

Beneficial effects of the present invention are as follows:
1. According to the present invention, the test device has a rotating disk and a driving mechanism, wherein the rotating disk can drive the model barrel to rotate under the action of the driving mechanism, and then drive the offshore wind turbine model and the seabed soils to rotate, so that the wind and wave loads are applied at different angles relative to the offshore wind turbine model under the condition that the directions of the wind and wave loads remain unchanged, which considers the working conditions of multiple directional loads, and is more in line with the actual marine environment and makes the test results more accurate, and the test results can guide the design of the foundation in the actual project and strengthen the strength design of the main force direction of the wind turbine foundation; moreover, applying the multi-directional wind and wave loads by rotating the offshore wind turbine model and the seabed soils, may make the entire test device low in cost and convenient in processing.

2. According to the present invention, the seabed soil holding sink and the model barrel of the test device both adopt cylindrical type, which makes the seabed soil holding sink not hinder the rotation of the model barrel when there is a small gap or sealing ring between the seabed soil holding sink and the model barrel, and avoids the influence on the flow of water in the water flume caused by a gap too large between the seabed soil holding sink and the model barrel.

3. According to the present invention, the test device has a wind hood and the fan is set at the outlet end of the top hood, which ensures that a uniform and stable airflow is formed in the air duct, and the load is applied through the fan, considering the characteristics of fluid changes in time and space.

4. According to the present invention, the width of the water flume of the test device is 1.5-1.7 m, and compared with the large pool type, the waves formed are more uniform and stable.

5. According to the present invention, the seabed soil and the offshore wind turbine model can be placed in the model barrel of the test device, by considering the interaction and mutual feedback coupling mechanism between the offshore wind turbine and complex external environment (wind and waves and seabed geology), the test results are more valuable for reference.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

Wherein, 1, water flume; 2, wind field section; 3, transition section; 4, flexible tube; 5, fan; 6, seabed soil holding sink; 7, rotating disk; 8, connecting rod; 9, bearing; 10, sealing ring; 11, first gear; 12, second gear; 13, servo motor; 14, fan support; 15, servo motor; 16, ball screw; 17, push plate; 18, guide block; 19, guide rail; 20, bottom support structure; 21, thrust bearing; 22, wave-making mechanism; 23, top hood; 24, air inlet end; 25, model barrel; 26, offshore wind turbine model; 27, driving mechanism; 28, output shaft; 29, flow stabilization grid; 30, damping grid; 31, inverter pump; 32, water inlet end; 33, water outlet end.

DETAILED DESCRIPTION

Example 1

The present example provides an integrated multidirectional loading model test device for offshore wind turbines, as shown in FIGS. 1-6, comprising a water flume 1, the water flume 1 comprises a frame body, the frame body comprises a plurality of columns, a water flume bottom frame provided in a space between a bottom of the columns is welded and fixed with the columns, the water flume bottom frame is a frame structure composed of transverse beams and longitudinal beams welded, an upper side beam is provided between a top of the columns, the water flume bottom frame, the column and the upper side beam form a frame body structure of the water flume.

Figure 1:
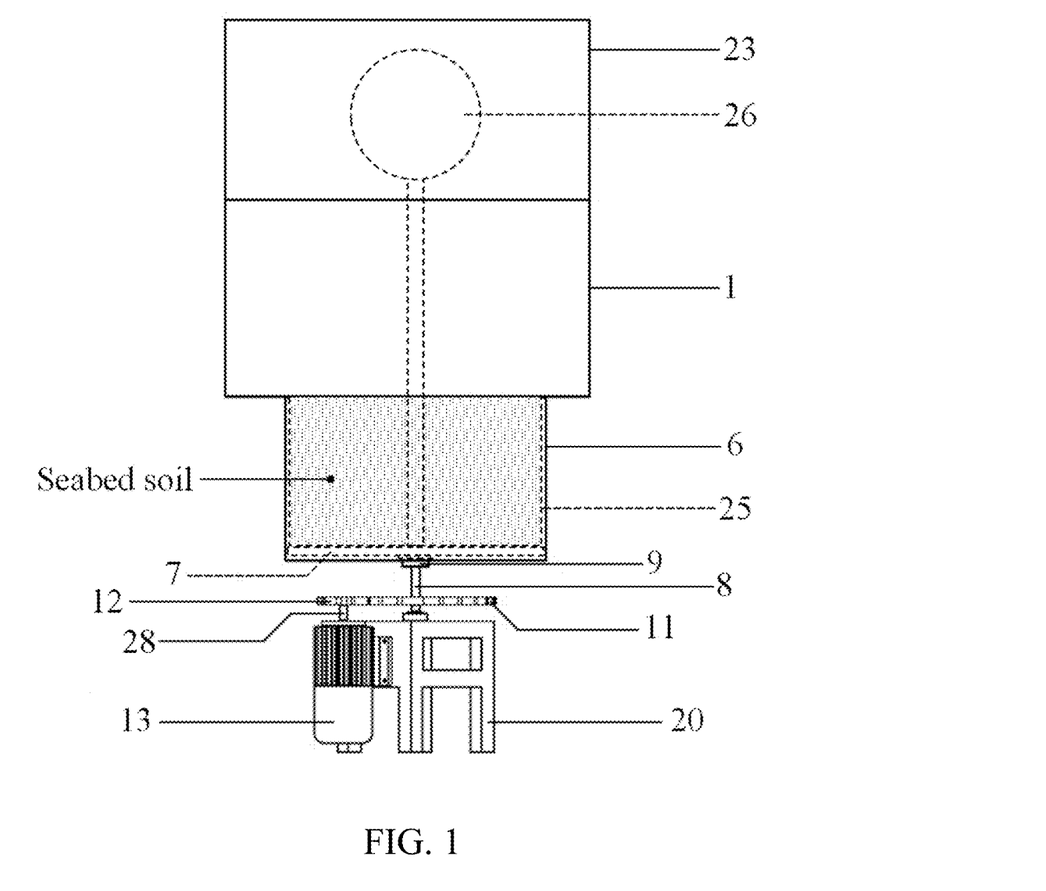
FIG. 1 is a front view of an assembly of a driving mechanism, a seabed soil holding sink and a water flume of Example 1 of the present invention.
Figure 2:
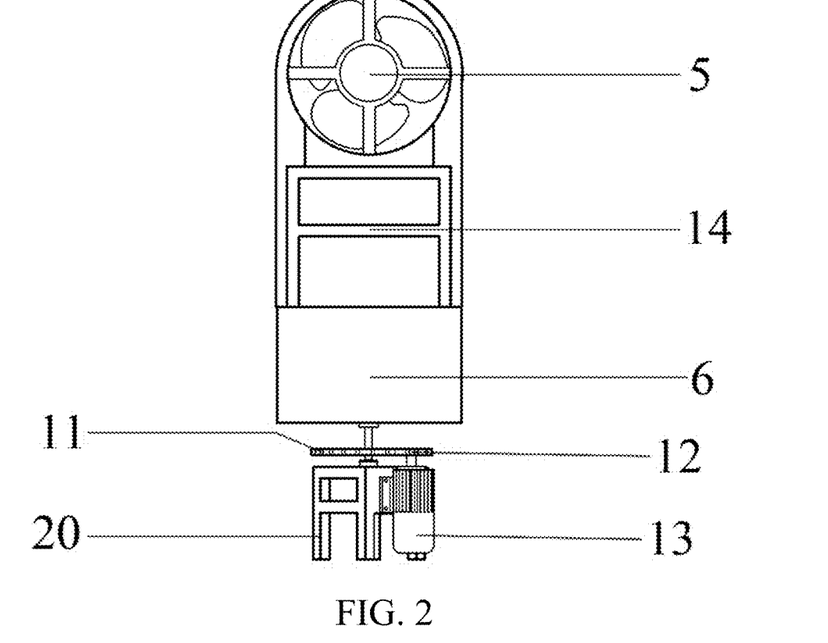
FIG. 2 is a side view of the assembly of the driving mechanism, the seabed soil holding sink and the water flume of Example 1 of the present invention.

Tank wall glasses are provided on side walls of the frame body structure, and a tank bottom glass is provided on the water flume bottom frame.

In the present example, a length of the water flume 1 is 19 m, a net depth is 1.2 m, and a width is 1.5-1.7 m. The width of the water flume 1 in the present example is 1.6 m, which ensures the stability and uniformity of the waves formed.

Figure 3:
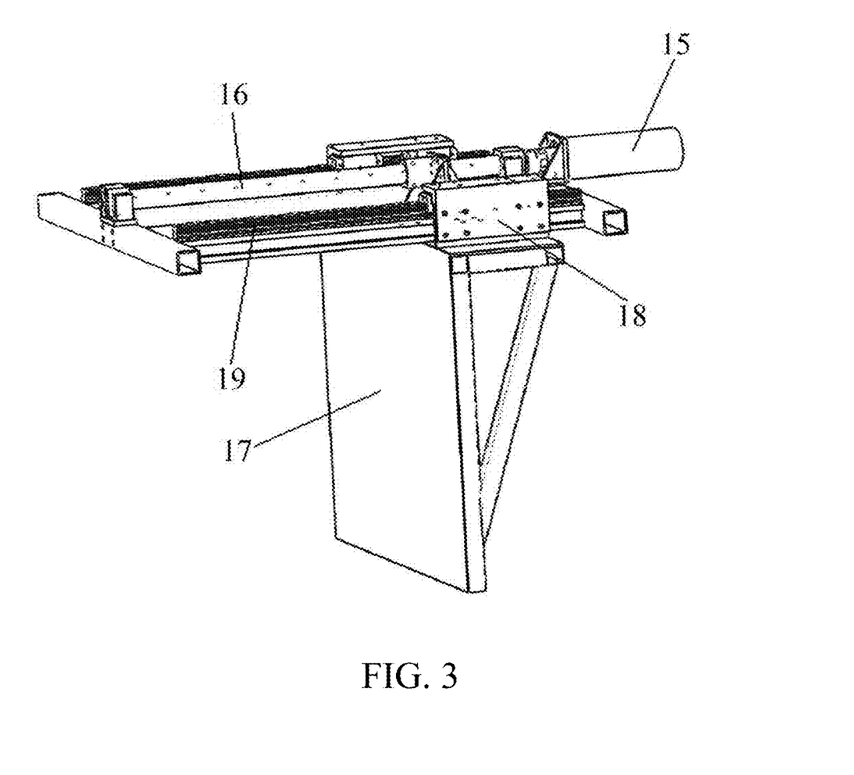
FIG. 3 is a schematic diagram of a structure of a wave-making mechanism of Example 1 of the present invention.

A wave-making mechanism 22 is provided at a first end of the water flume 1 and is used to exert thrust on the water in the water flume to form waves. The wave-making mechanism 22 can use the existing wave-making mechanism 22, comprising a push plate, which is connected to a driving component that can output horizontal movement. The driving component can drive the push plate to move, so that the water in the water flume can form waves.

In the present example, the driving component adopts a lead screw transmission mechanism, comprising a servo motor 15 fixed at the top of the water flume, an output shaft 28 of the servo motor is connected to a ball screw 16, and a screw slider provided on the ball screw 16 is fixedly connected to the push plate 17, while a guide block 18 provided on the push plate 17 is slidingly connected to a guide rail 19 fixed at the top of the water flume, controlling the precision servo motor to rotate according to a specific speed time sequence, and then through the ball screw and the screw slider, driving the push plate to make a reciprocating linear motion, to give the water body to disturb and generate waves.

The second end of the water flume 1 is provided with a wave-dissipating mechanism, which is fixed to the internal tank wall at the end of the water flume, and the wave-dissipating mechanism may adopt the existing wave-dissipating element and is not described in detail here.

The water flume 1 is provided with a water inlet and a drainage port, the water inlet is used to add water to the water flume, the drainage port is used to discharge the water in the water flume after the test is completed, a valve is mounted at the water inlet and the drainage port, respectively, for controlling the opening and closing of the water inlet and the drainage port.

The second end of the water flume 1 provided with the wave-dissipating mechanism is set as an outlet end, and a water outlet is provided thereon, and the water outlet is connected to an inlet of an inverter pump 31 through a circulating pipeline, and an outlet of the inverter pump 31 is connected to a circulating water inlet at the first end of the water flume 1 through the circulating pipeline.

The water outlet and the circulating water inlet are mounted with electric regulating butterfly valve, which is used to control the opening and closing of the water outlet and the circulating water inlet, and the circulating pipeline is also mounted with an electromagnetic flow meter, which is used to obtain the flow of water in the circulating pipeline in real time.

The water in the water flume 1 flows into the circulating pipeline through the water outlet, and can flow back into the water flume 1 through the circulating water inlet under the action of the inverter pump 31 to realize the recycling of water and reduce the cost of the experiment.

Figure 4:
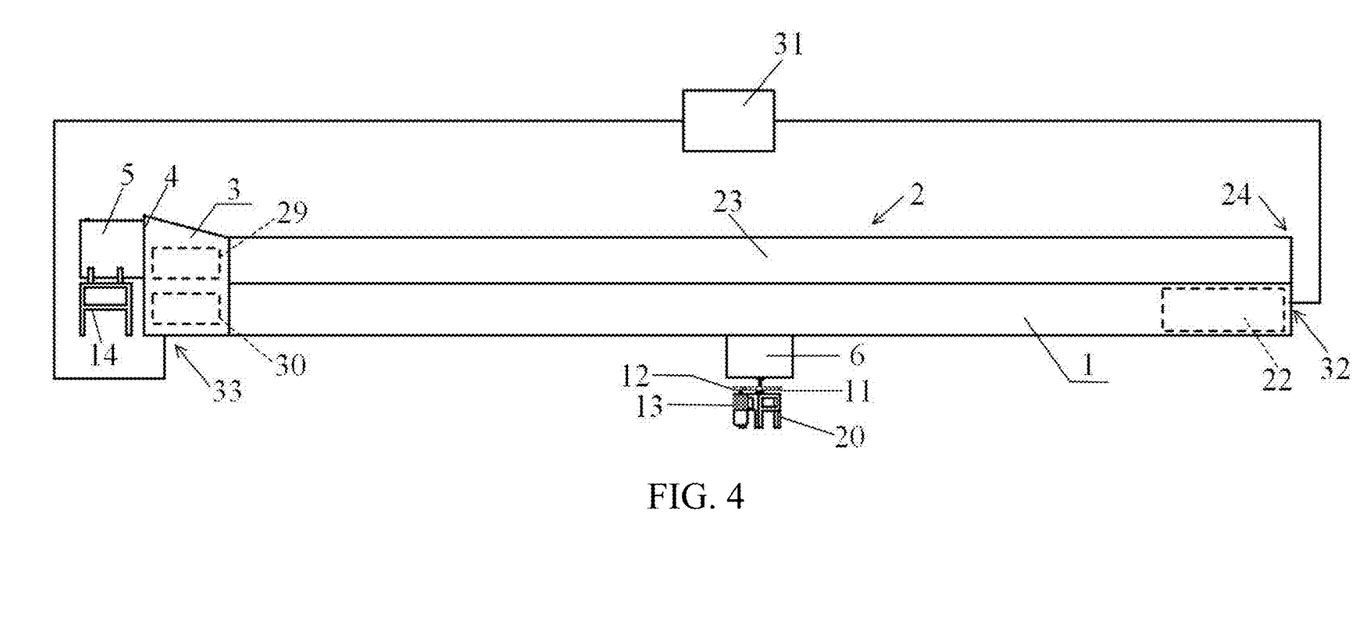
FIG. 4 is a front view of an assembly of the water flume, a top hood and a fan of Example 1 of the present invention.

A top of the water flume 1 is fixed with a top hood 23, which forms an air duct.

The top hood 23 comprises a wind field section 2 and a transition section 3, and the wind field section 2 is composed of a plurality of semi-circular structure of the hood bodies removable splicing, and the hood bodies and the top of the water flume 1 removable connection.

Specifically, the adjacent hood bodies can be detachably and fixedly connected through a flange ring and fixing bolts, and two side ends of the hood body can be detachably connected with the top of the water flume through the flange plate and the fixing bolts.

The hood body is made of acrylic plate with a radius of 800 mm and a length of each the hood body is 1200 mm. In the present example, the wind field section consists of 14 hood bodies spliced together, and the seams of adjacent hood bodies and the connection between the hood bodies and the water flume are sealed using sealing rubber.

It is understood that the length of the wind field section 2 can be set according to the needs of the test, i.e., the number of hood bodies can be adjusted according to the needs.

A first end of the wind field section 2 is used as an air inlet end 24, which is provided near to the end of the water flume 1 where the wave-making mechanism 22 is provided, and a second end of the wind field section is connected to the transition section 3. The transition section 3 adopts an involute structure with a gradual expansion and upwarping bell mouth structure, and an end with smaller area thereof is connected to the wind field section 2, i.e., it is fixedly connected to the hood body at the last end.

Adopting the involute structure may increase the inlet air volume while stabilizing the gas flow rate.

The end with larger area of the involute structure is connected to a first end of a flexible tube 4, and a second end of the flexible tube 4 is connected to a fan 5. The fan is fixed to a fan bracket 14. The fan bracket 14 is fixed to the ground foundation.

Adopting the flexible tube 4 may provide vibration protection, and a flow stabilization grid 29 and a damping network is mounted inside of the flexible tube 4 for combing the airflow and eliminating turbulence.

The fan 5 uses a DC type high-power fan, which is an axial flow fan, with a rated voltage of 380V, a power of about 22.0 kW, a diameter of about 1500 mm, and a maximum air volume of about 93,000 m³/h. The fan is connected to a control system through a frequency converter, and the wind speed of the wind field in the air duct above the water flume may be adjusted by the frequency converter.

In the present example, the fan 5 is provided at an air outlet end of the air duct to ensure a uniform and stable airflow within the air duct.

A wind speed detection element is provided at an inner side of the top hood 23, the wind speed detection element adopts a differential pressure type wind speed sensor, configured with 12-way linear optocoupler fully isolated DC signal acquisition module, 24-bit high-precision AD measurement chip, with linear measurement range up to 0.2%; being equipped with 10-way pressure sensing, measuring pressure range of −1-1 KPa, accuracy not less than 0.2% FS; and being equipped with a straight standard Pitot wind speed tube, measuring speed range of 1-50 m/s.

The differential pressure type wind speed sensor is mounted on the frame body, which is placed inside the water flume and set close to the seabed soil holding sink.

The seabed soil holding sink 6 is provided at a set position of the bottom of the water flume, and a top of the seabed soil holding sink 6 is fixedly connected to the bottom of the water flume 1, and an internal space of the seabed soil holding sink 6 is connected to the internal space of the water flume 1.

Figure 5:
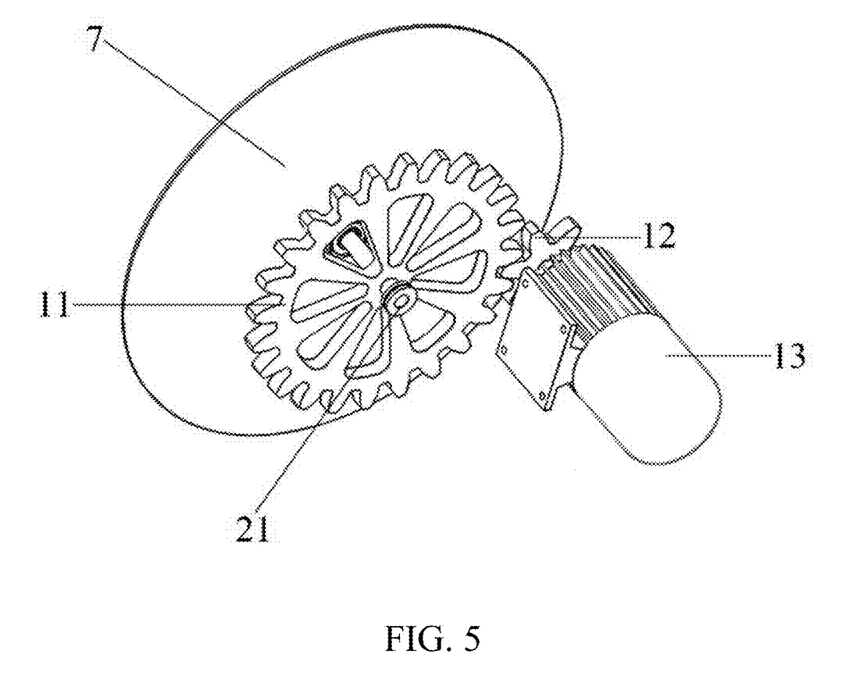
FIG. 5 is a schematic diagram of an assembly of the driving mechanism and a rotating disk of Example 1 of the present invention.

In the present example, the seabed soil holding sink 6 adopts a cylindrical structure made of steel, an inner diameter of the seabed soil holding sink 6 is 1.5 m, and a rotating disk 7 coaxially provided with the seabed soil holding sink 6 is provided at the bottom of the seabed soil holding sink 6, and the rotating disk 7 is connected to a driving mechanism 27, and the driving mechanism 27 can drive the rotating disk 7 to rotate around its own axis.

A model barrel 25 is fixed on the rotating disk 7 and is used to place the seabed soil, which may fix the offshore wind turbine model 26.

The model barrel 25 is a cylindrical barrel, and a top surface thereof is flush with a tank surface of the bottom of the water flume; a distance between an outer barrel surface of the model barrel 25 and internal tank surfaces of the seabed soil holding sink 6 is less than a set value, or the outer barrel surface of the model barrel 25 sliding fits with the inner tank surfaces of the seabed soil holding sink 6, or the inner tank surfaces of the seabed soil holding sink 6 are provided with a sealing ring, which sliding fits with the outer barrel surface of the model barrel 25.

With this setting, the gap between the model barrel 25 and the seabed soil holding sink will not be too large when the model barrel 25 rotates around its axis with the rotating disk, thus avoiding the impact on the water flow in the water flume 1.

Figure 6:
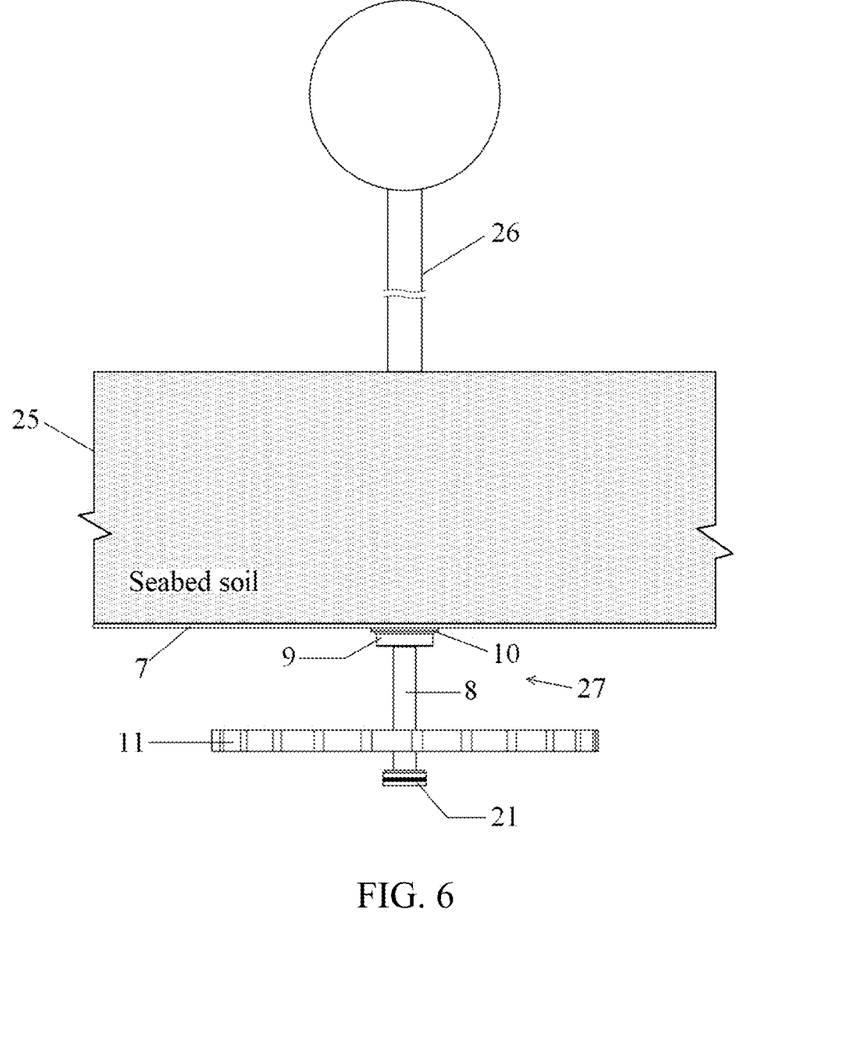
FIG. 6 is a schematic diagram of an assembly of the rotating disk with a connecting rod, a first gear and a second gear of Example 1 of the present invention.

The driving mechanism 27 comprises a connecting rod 8 being fixed at the center of the bottom surface of the rotating disk 7, wherein a first end of the connecting rod 8 is fixed to the rotating disk 7, and a second end is connected to the driving element through the transmission mechanism after passing through the bottom tank wall of the seabed soil holding sink 6. The driving element can drive the connecting rod and the rotating disk to rotate through the transmission mechanism, and then drive the model barrel 25 to rotate.

In the present example, a sealing ring 10 is provided between the connecting rod and the bottom tank wall of the seabed soil holding sink, and the sealing ring 10 is fixed to an inner hole surface of an opening hole on the bottom tank wall to prevent water from leaking out of the seabed soil holding sink, and a bearing 9 is provided below the sealing ring 10, and an inner ring of the bearing 9 is fixedly connected to the connecting rod, and an outer ring of the bearing 9 is fixedly connected to the inner hole surface of the opening hole on the bottom tank wall, thus realizing the rotational seal connection between the connecting rod and the bottom tank wall.

In some other implementations, a rotary shaft seal is provided between the connecting rod and the bottom tank wall of the seabed soil holding sink, and the rotary shaft seal adopts the existing structure and is not described in detail here.

The transmission mechanism adopts a gear transmission mechanism, comprising a first gear 11 fixedly connected to the connecting rod, the first gear 11 engages with a second gear 12, the second gear 12 is connected to the driving element, the driving element adopts a servo motor 13, and an output shaft 28 of the servo motor is fixedly connected to the second gear. The servo motor is fixed to a motor mount.

A center position of a bottom face of the first gear is fixedly connected to a top end of a support rod, and a bottom end of the support rod is rotatably connected to a bottom support structure 20 through a thrust bearing 21, and the first gear is supported by the support rod, which in turn supports the connecting rod and the rotating disk.

The servo motor 13 can drive the connecting rod 8 to rotate through the first gear 11 and the second gear 12, and then drive the rotating disk 7 and the model barrel 25 to rotate around their own axes to achieve 360° angular rotation control on horizontal plane of the model barrel 25.

A rotation angle detecting element is mounted on the first gear 11 and/or the second gear 12, and the rotation angle detecting element adopts the rotation angle sensor for detecting the rotation angle of the first gear or the second gear, so as to detect the rotation angle of the offshore wind turbine model 26 and facilitate the control of the rotation angle of the offshore wind turbine model 26.

A working method of the present example is as follows:
adding a set amount of seabed soil to the model barrel 25 and installing the offshore wind turbine model 26 in the seabed soil, with a foundation portion of the offshore wind turbine model 26 buried in the seabed soil and blade portions of the offshore wind turbine model 26 located in the air duct above the water flume;

adding a set amount of water to the water flume, and a water level in the water flume should not exceed 0.9 m;

starting the wave-making mechanism 22 and the fan, and the wave-making mechanism 22 drives the water in the water flume to generate waves, and the fan generates wind in the air dust to apply wind and wave loads to the offshore wind turbine model 26; through the inverter pump 31, a frequency, a wave length, a wave height and a wave velocity of the wave can be controlled to provide the directional horizontal load for the offshore wind turbine model 26 embedded in the seabed soil;

controlling the servo motor to work according to program instructions, and the servo motor drives the connecting rod to rotate through the first gear and the second gear, which in turn drives the rotating disk and the model barrel 25 to rotate at a set angle, and the offshore wind turbine model 26 rotates at the set angle with the model barrel 25 to realize the wind and wave loads from different angles of the offshore wind turbine model 26; and transmitting the current angle value to the control system by the rotation angle sensor in real time to facilitate the control of the rotation angle of the offshore wind turbine model 26.

By adopting the test device of the present example, the wind and wave loads may be applied at different angles relative to the offshore wind turbine model 26 under the condition that the directions of the wind and wave loads remain unchanged, the working condition of loads in multiple directions is considered, which is more consistent with the actual marine environment and makes the test results more accurate, and the test results can guide the design of the foundation in the actual project and strengthen the strength design of the main force direction of the wind turbine foundation, and applying the multi-directional wind and wave loads by rotating the offshore wind turbine model 26, may make the entire test device low in cost and convenient in processing.

According to the test device of the present example, on the basis of the conventional water flume device, a single high-power suction fan and a top hood 23 are provided; compared with the test device of the present example, the traditional matrix fan requires multiple fans to work together to ensure the wind speed, but the wind speed and flow field between the fans interfere with each other, and this setting is commonly used in large reservoir-type laboratories and the wind direction change thereof is considered by setting fans on all sides of the pool, or the wind speed direction is controlled by moving the fan through the guide rail; however, this mode occupies a large area and is not applicable to traditional tank devices; the large reservoir-type wind and wave experimental field is expensive, the site thereof is open and the wind speed is difficult to stabilize, and the impact between the wind and wave is difficult to control, while the water flume device is a common hydraulic experimental device, under the closure of the top hood 23, the wind speed is uniform and controllable, and the wind and wave are in the same direction, the impact between them may also be controlled, so it's more suitable for testing and research.

Compared with the traditional matrix fan, the single high-power fan has the advantages of high wind speed and strong stability, but high-power fans are heavy, inconvenient to move, conventional devices can only achieve one-way-loading of the wind and wave loads, so the present example is based on the idea of relative motion, by rotating the offshore wind turbine model 26 and the seabed soils to achieve the relative rotation between the wind, the wave and the fan, the soils.

In addition, the reservoir-type test device, although it can realize the wind direction 360° change, but only using the traditional wave pushing plate device is difficult to realize the wave direction 360° change, the present example can realize the direction of wind and wave action change at the same time through the rotation of the offshore wind turbine model 26 and the seabed soils.

Although the specific examples of the present invention are described above in combination with the accompanying drawings, it is not a limitation on the protection scope of the present invention. Those skilled in the art should understand that on the basis of the technical solution of the present invention, various modifications or deformations that can be made by those skilled in the art without creative labor are still within the protection scope of the present invention.

What is claimed is:
1. An integrated multidirectional loading model test device for offshore wind turbines, comprising:
a water flume,
a wave-making mechanism provided at a first end of the water flume, a top hood provided at a top of the water flume to form an air duct, a first end of the top hood being formed as an air inlet end and a fan is being provided at a second end of the top hood, a seabed soil holding sink provided at a set position at a bottom of the water flume, a rotating disk provided at a bottom of an interior of the seabed soil holding sink, a model barrel for placing seabed soil and an offshore wind turbine model being fixed on the rotating disk, and the rotating disk being connected to a driving mechanism to drive the model barrel to rotate, so that a relative motion between the model barrel and the fixed water flume can be generated to achieve an application of wind and wave loads in different directions to the offshore wind turbine model;

wherein (i) both the seabed soil holding sink and the model barrel are of cylindrical structure, and a gap between an outer side of the model barrel and an inner side of the seabed soil holding sink is less than a set value, or (ii) the outer side of the model barrel slides against the inner side of the seabed soil holding sink, or (iii) the outer side of the model barrel is provided with a sealing ring against the inner side of the seabed soil holding sink; and wherein the driving mechanism comprises a driving component, the driving component is connected to a connecting rod via a transmission mechanism, a first end of the connecting rod is fixedly connected to the rotating disk, and a second end of the connecting rod is rotatably connected to a tank wall of the bottom of the seabed soil holding sink.

2. The integrated multidirectional loading model test device for offshore wind turbines according to claim 1, wherein:

the transmission mechanism comprises a first gear fixed to the connecting rod, the first gear engages with a second gear, the second gear is connected to an output shaft of the driving component, a bottom end of the first gear is fixedly connected to a first end of a support rod, a second end of the support rod is rotatably connected to a bottom support structure via a thrust bearing, the bottom support structure is used for fixing to a foundation, and a rotation angle detection element is mounted on the first gear and/or the second gear.

3. The integrated multidirectional loading model test device for offshore wind turbines according to claim 1, wherein:

a wind speed detection element is provided in the air duct, and the wind speed detection element is mounted on a frame body placed inside the water flume.

4. The integrated multidirectional loading model test device for offshore wind turbines according to claim 1, wherein:

the top hood comprises a wind field section and a transition section, the wind field section being is made up of a plurality of hoods spliced together, and the transition section is of an involute structure with a smaller area end connected to the wind field section and a larger area end connected to the fan via a flexible tube.

5. The integrated multidirectional loading model test device for offshore wind turbines according to claim 4, wherein a flow stabilization grid and a damping grid are mounted inside the flexible tube.

6. The integrated multidirectional loading model test device for offshore wind turbines according to claim 1, wherein a width of the water flume is 1.5-1.7 m.

7. The integrated multidirectional loading model test device for offshore wind turbines according to claim 1, wherein:

a water outlet end of the water flume is connected to an inlet of an inverter pump through a pipeline, and an outlet of the inverter pump is connected to a water inlet end of the water flume through a pipeline.

8. The integrated multidirectional loading model test device for offshore wind turbines according to claim 1, wherein a second end of the water flume is provided with a wave-dissipating mechanism.

* * * * *